United States Patent
Delfyett et al.

(10) Patent No.: US 6,735,229 B1
(45) Date of Patent: May 11, 2004

(54) ULTRALOW NOISE OPTICAL CLOCK FOR HIGH SPEED SAMPLING APPLICATIONS

(75) Inventors: Peter J. Delfyett, Geneva, FL (US); Tolga Yilmaz, Orlando, FL (US); Christopher M. Depriest, Winter Park, FL (US)

(73) Assignee: University of Central Florida, Orlando, FL (US)

( * ) Notice: Subject to any disclaimer, the term of this patent is extended or adjusted under 35 U.S.C. 154(b) by 0 days.

(21) Appl. No.: 10/443,495

(22) Filed: May 22, 2003

Related U.S. Application Data

(60) Provisional application No. 60/382,741, filed on May 23, 2002.

(51) Int. Cl.[7] ............................................. H01S 3/00
(52) U.S. Cl. ........................ 372/38.08; 372/18; 372/26
(58) Field of Search .............................. 372/38, 28, 26, 372/18

(56) References Cited

U.S. PATENT DOCUMENTS

| | | | |
|---|---|---|---|
| 5,381,426 A | | 1/1995 | Fontana et al. ............... 372/18 |
| 5,440,573 A | * | 8/1995 | Fermann ....................... 372/18 |
| 5,450,427 A | | 9/1995 | Fermann et al. .............. 372/18 |
| 5,504,771 A | * | 4/1996 | Vahala et al. ................. 372/94 |
| 5,590,143 A | | 12/1996 | Takara et al. ................. 372/28 |
| 5,619,320 A | | 4/1997 | Eiselt et al. ................ 356/73.1 |
| 5,761,228 A | | 6/1998 | Yano ............................. 372/26 |
| 5,781,327 A | | 7/1998 | Brock et al. ................. 359/249 |
| H1926 H | * | 12/2000 | Carruthers et al. ............ 372/6 |
| 6,256,328 B1 | | 7/2001 | Delfyett et al. ............... 372/23 |
| 6,404,798 B1 | * | 6/2002 | Leckel et al. ............... 372/108 |
| 6,606,331 B2 | * | 8/2003 | Sousa et al. .................. 372/32 |
| 2003/0165164 A1 | * | 9/2003 | Delfyett et al. .............. 372/18 |

OTHER PUBLICATIONS

G.T. Harvey, et al., Harmonically mode-locked fiber ring laser with an internal Fabry-Perot stabilizer for soliton transmission, 1993 Optical Society of America, Optics Letters, Jan. 15, 1993, vol. 18, No. 2, pp. 107-109.

X. Shan, et al., Novel Method to Suppress Noise in Harmonically Modelocked Erbium Fibre Lasers, Electronics Letters, 27th May 1993, vol. 29, No. 11, pp. 979-981.

E.R. Thoen, Stabilization of an active harmonically mode-e-locked fiber laser using two-photon absorption, Optics Letters, vol. 25, No. 13, Jul. 1, 2000, pp. 948-950.

J.E. Bowers, Residual and absolute timing jitter in actively mode-locked semiconductor lasers, Electronics Letters, 22nd Nov. 1990, vol. 26, Nov. 24, pp. 2026-2028.

* cited by examiner

Primary Examiner—Leon Scott, Jr.
(74) Attorney, Agent, or Firm—Brian S. Steinberger; Law Offices of Brian S. Steinberger, P.A.

(57) ABSTRACT

Methods and systems for using a laser type clock to produce a train of ultra-stable optical pulses. The methods and systems include generating an approximately 10 GHz ultralow noise pulse train from a harmonically modelocked laser having an intracavity Fabry-Perot etalon filter from a semiconductor lasers such as ring lasers, and the like. System output can have residual phase modulation(PM) noise values of approximately 18 fs and amplitude modulation(AM) noise values of approximately 0.05% RMS, and residual phase modulation(PM) noise values of approximately 94 fs and amplitude modulation(AM) noise values of approximately 0.05% RMS.

20 Claims, 5 Drawing Sheets

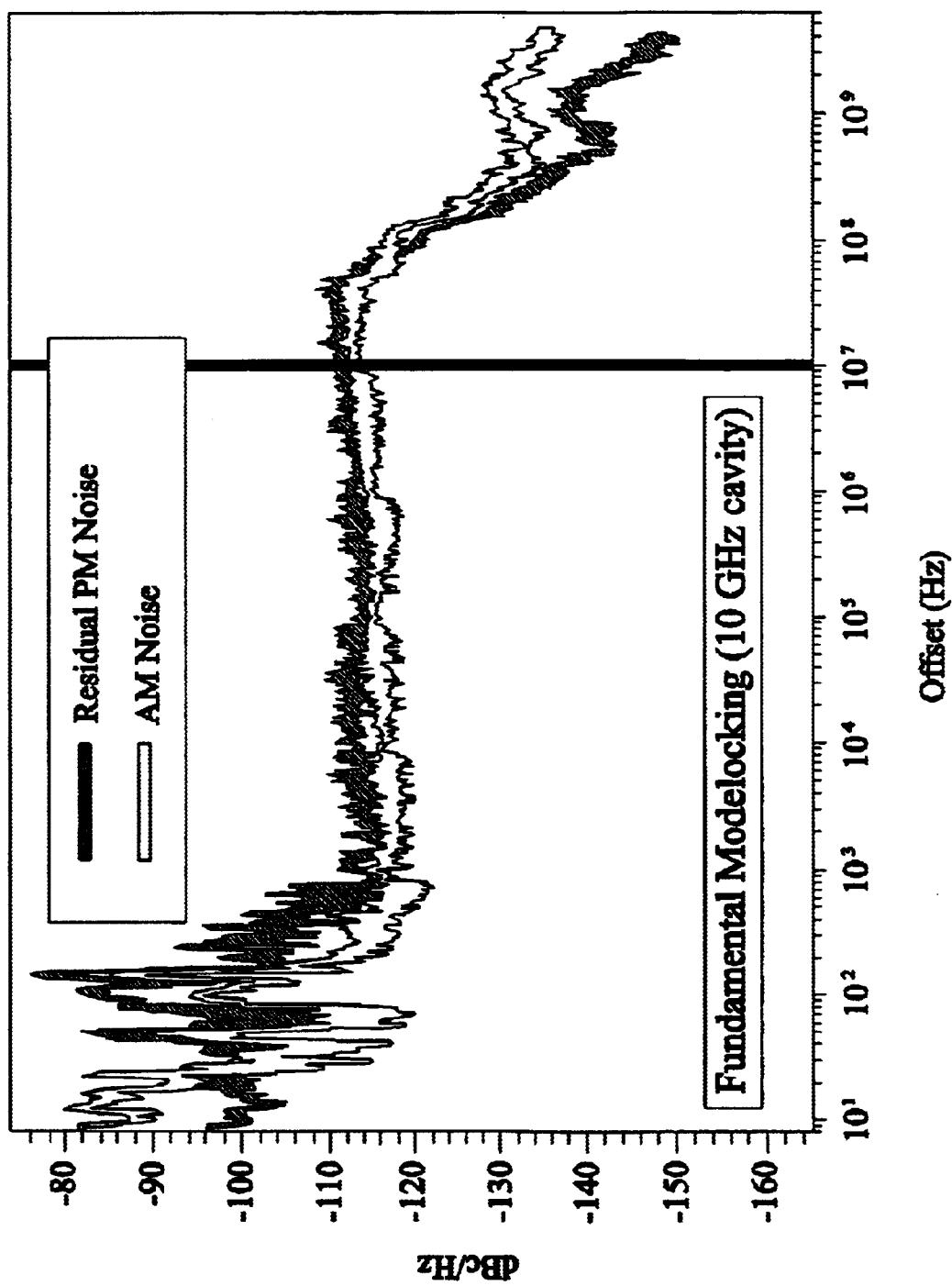

ULTRALOW NOISE OPTICAL CLOCK FOR HIGH SPEED SAMPLING APPLICATIONS

This invention relates to lasers, in particular to methods and systems for ultra low noise and supermode suppression in lasers such with an actively mode-locked external-cavity semiconductor diode ring laser having a Fabry-Perot etalon as an intracavity filter that produces ultralow-noise pulse trains, and this invention claims the benefit of priority to U.S. Provisional Patent Application No. 60/382,741 filed May 23, 2002.

BACKGROUND AND PRIOR ART

The erbium-doped fiber amplifier (EDFA) is an optical gain medium that is widely used in the telecommunications arena and it possesses an intrinsically low gain per unit length. In optical resonator applications, this forces the need for an extended gain medium, which causes the fundamental cavity frequency to remain rather low (typically 1–10 MHz). Such systems, therefore, require modelocking at extremely high orders to operate at typical (multi-GHz) bit rates.

Harmonically modelocked laser oscillators suffer a unique type of noise first encountered by that is now commonly referred to as supermode noise. See M. F. Becker, D. J. Kuizenga, and A. E. Siegman, "Harmonic mode locking of the Nd: YAG laser", J. Quantum Electron. 8, 687 (1972). This noise results from the statistical independence of individual intracavity pulses, each of which must originate from a slightly different photon noise fluctuation. The resulting small differences between intracavity pulses cause a small amount of amplitude noise to appear at every harmonic of the cavity fundamental.

Suppression of this noise has been attempted lasers using various experimental techniques: incorporation of an intracavity etalon(See G. T. Harvey, L. F. Mollenauer, "Harmonically mode-locked fiber ring laser with an internal Fabry-Perot stabilizer for soliton transmission", Opt. Lett. 18, 107 (1993)); cavity length dithering at kHz rates(See X. Shan and D. M. Spirit, "Novel method to suppress noise in harmonically modelocked erbium fibre lasers", Electron. Lett. 29, 979 (1993)); and by the use of two-photon absorption to prevent pulse dropouts(See 4. E. R. Thoen, M. E. Grein, E. M. Koontz, E. P. Ippen, H. A. Haus, and L. A. Kolodziejski,"Stabilization of an active harmonically mode-locked fiber laser using two-photon absorption", Opt. Lett. 25, 948 (2000)). However, none of these techniques adequately reduces the noise problems enough.

Various patents have been proposed in the area. See for example, U.S. Pat. No. 5,381,426 to Fontana et al.; U.S. Pat. No. 5,450,427 to Fermann et al.; U.S. Pat. No. 5,590,143 to Takara et al.; U.S. Pat. No. 5,619,320 to Eiselt et al.; U.S. Pat. No. 5,761,228 to Yano; U.S. Pat. No. 5,781,327 to Brock; and U.S. Pat. No. 6,256,328 to Delfyett et al., the latter having the same assignee as that of the subject invention. However, none of the prior art adequately solves the noise problems referenced above.

SUMMARY OF THE INVENTION

A primary objective of the present invention is to provide a method and system for ultralow noise and supermode suppression in an actively modelocked external-cavity semiconductor diode laser.

The invention includes a method and system for the suppression of supermode noise in an approximately 10 GHz external-cavity semiconductor diode laser by using a high-finesse intracavity etalon. Using a recently-developed wideband modification of the homodyne noise measurement technique of Derickson, et. al.(D. J. Derickson, A. Mar, and J. E. Bowers, "Residual and absolute timing jitter in actively modelocked semiconductor lasers", Electron. Lett. 26, 2026 (1990).), the inventors have made extended noise sideband measurements out to the Nyquist offset frequency (approximately 5 GHz). Measurements reveal that the supermode suppression is almost total over the entire Nyquist band, attenuating the noise spikes below the approximately—140 dBc/Hz white noise floor of the system. The invention also compares the noise of this harmonically-modelocked laser with a similar fundamentally-modelocked laser (also operating at approximately 10 GHz) to illustrate the advantages and disadvantages of each approach.

Further objects and advantages of this invention will be apparent from the following detailed description of a presently preferred embodiment which is illustrated schematically in the accompanying drawings.

BRIEF DESCRIPTION OF THE FIGS.

FIG. 2b shows modelocked laser noise sidebands for fundamental modelocking at 10 GHz.

DESCRIPTION OF THE PREFERRED EMBODIMENTS

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

Figure 1:
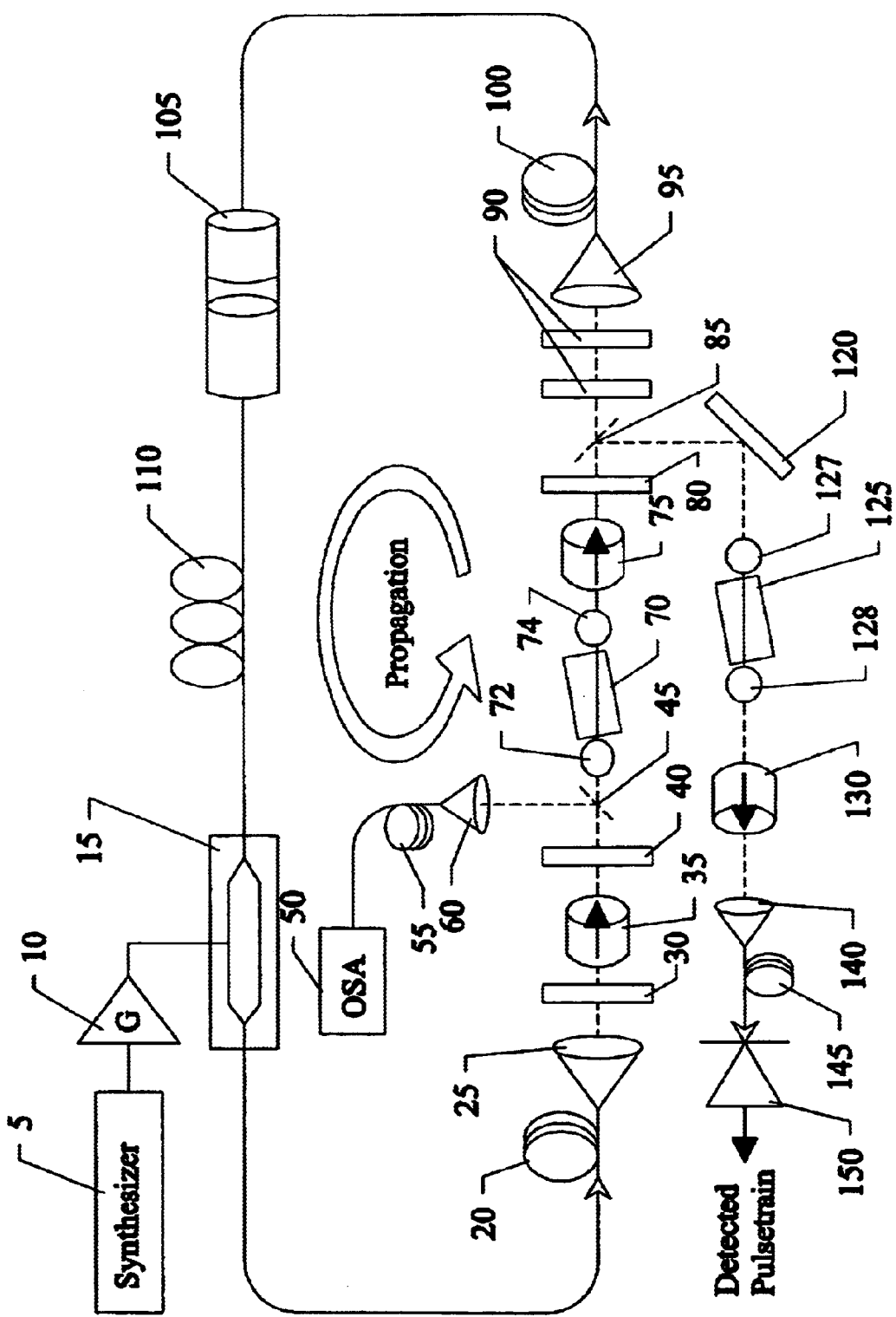
FIG. 1 is layout of a preferred embodiment of the invention.

A layout of a preferred embodiment is illustrated in FIG. 1. Polarization properties are found to be critical for best noise performance, therefore the unidirectional ring cavity was designed with no turning mirrors (which can sometimes degrade the polarization state). The free-space section contains extensive isolation Faraday isolators 35, 75, such as but not limited to OFR IO-4-1550-VLP model, of approximately 40 dB isolation and polarization-controlling optics, which can include fiber launchers 25, 95(such as those manufactured by Newport) and ½ and ¼ waveplates 30, 40, 80, and 90, respectively, surrounding an InGaAsP semiconductor optical amplifier (SOA) 70. Both approximately 1.0 and approximately 2.3 mm SOAs, such as semiconductor optical amplifiers, manufactured by Sarnoff Corporation, were used in these experiments with saturation powers of approximately 10 and approximately 13 dBm, respectively at approximately 150 mA bias current. Collimating lens 72, 74 can be located on both sides of the SOA 70.

Modelocking of the ring cavity was accomplished via laser cavity loss modulation using a PM-fiber-pigtailed SDL IOAP-MOD9170-F-F-0 model Mach-Zehnder modulator (MZM) 15 having an approximately 20 GHz modulation bandwidth. The MZM was driven by a HP 83712B model microwave synthesizer 5 whose output was amplified to approximately 25 dBm by a Miteq MPN4 model amplifier 10. When operating with suppressed supermodes, a high-finesse (approximately 180 finesse) approximately 10 GHz fiber-Fabry-Perot (FFP) filter(an etalon filter) 105, such as one manufactured by Micron Optics, and 3-ring polarization controller (PC) 110 were added to the fiberized portion of the cavity. Without the intracavity FFP 105 and PC 110, the fundamental cavity frequency is approximately 58 MHz (modelocking at the approximately 173rd harmonic). Incorporating these components for supermode suppression causes the cavity frequency to fall to approximately 18 MHz (557th harmonic).

An OSA optical spectrum analyzer, such as but not limited to ANDO AQ6317B, can be used to measure the optical spectrum, to monitor tells chirp characteristics of laser. Reference labels 20, 100 and 145 can refer to optical fibers.

Cavity output coupling is achieved through the use of an uncoated 3 um pellicle beam splitter 85. The pulse train can be reflected off a mirror 120 and then undergoes single-pass amplification through a second 1.5 mm SOA(semiconductor optical amplifier) 125, also with collimating lens 127, 128, another Faraday Isolator 130 similar to those previously described, after which the free-space pulsetrain is launched by optics such as a fiber launcher(such as those manufactured by Newport) 140 into an optical fiber 145 and into a single-mode fiber-pigtailed Discovery Semiconductor DSC40S model photo detector 150 of an approximately 14 GHz bandwidth. Noise measurements of both amplitude modulation (AM) and residual phase modulation (PM) can then be performed on the detected signal.

FIG. 2 shows the results of AM and residual PM noise measurements for the harmonically-modelocked laser (2a) compared to similar measurements previously performed on a fundamentally-modelocked SOA system 5 (2b). It should be noted that the latter system does not provide a completely parallel example of the former. The SOA in the fundamentally-modelocked laser is a curved waveguide device incorporating an approximately 1.5 mm gain region and an approximately 50 um saturable absorber region (next to an HR-coated perpendicular facet). The cavity is defined by this perpendicular facet and a flat external mirror (approximately 90% reflectivity) placed immediately after a single collimating lens on the AR-coated side of the device.

Modelocking is achieved by modulating the voltage on the saturable absorber region. These differences cause the fundamentally-modelocked cavity to possess a slightly lower effective quality factor (Q-factor) than the harmonically-modelocked cavity. Such a discrepancy in effective Q-factor prevents a direct linear comparison between the offset "knee" (where the typically white noise at low frequencies starts to roll off in amplitude) and the fundamental longitudinal mode spacing of the cavities. However, a rough comparison of the noise spectra is still useful in illustrating the effects of harmonic modelocking on knee position and supermode noise.

The offset knee resides at approximately 80 kHz in the harmonically-modelocked noise curves and at approximately 55 MHz in the fundamentally-modelocked curves. Supermode noise spikes can be observed throughout the last three decades in FIG. 2a, but are absent in the fundamentally-modelocked laser. It should be noted that this supermode noise, thought to be solely due to amplitude modulation, is observed equally well in the phase noise spectrum. It has yet to be determined as to whether this is an artifact of the measurement technique or an actual characteristic of the laser (in which case a strong mechanism for AM-PM coupling is implied).

Figure 2A:
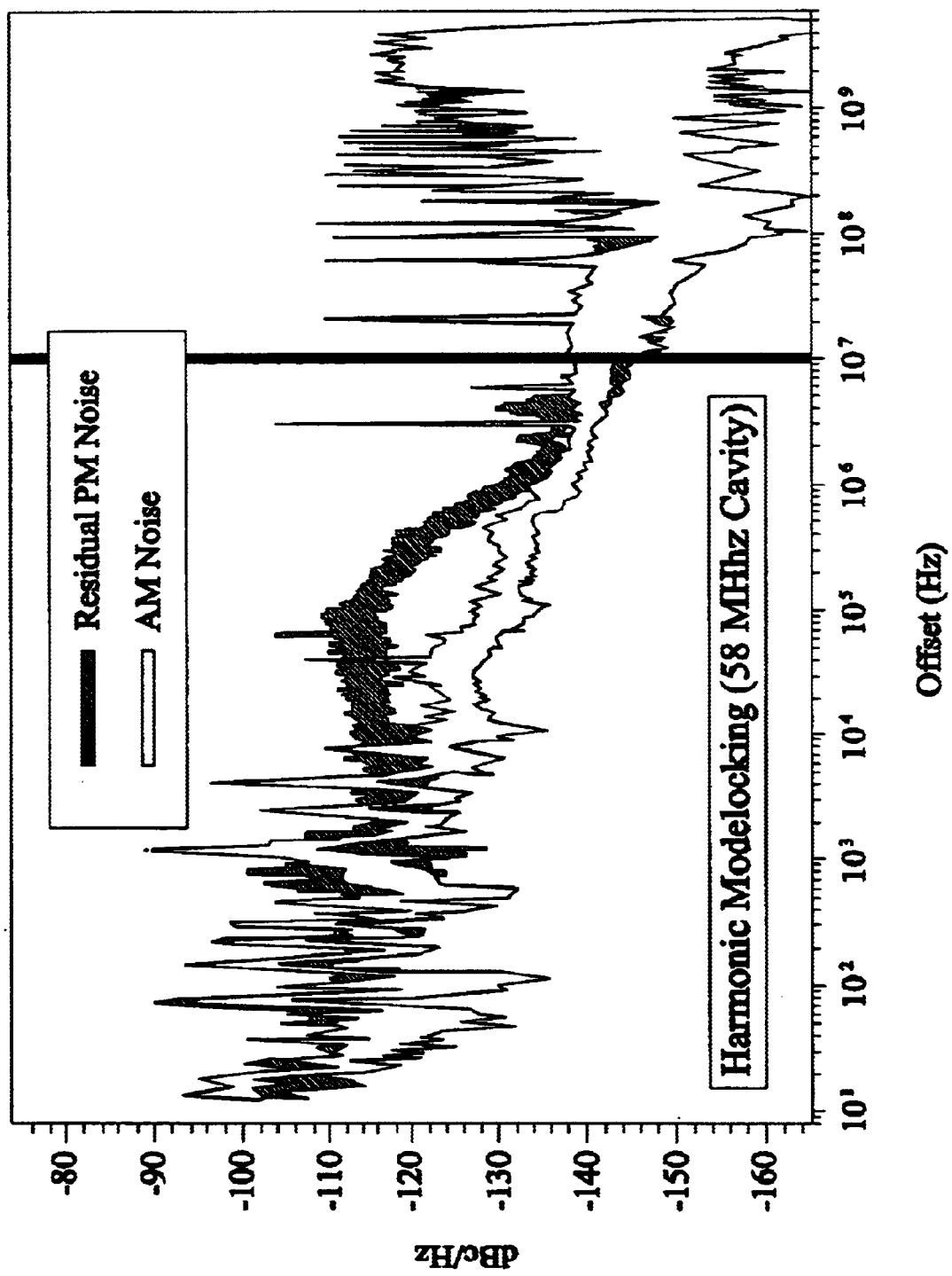
FIG. 2a shows modelocked laser noise sidebands for harmonic modelocking at 10 GHz.

Integrating the curves in FIG. 2a out to approximately 10 MHz (a standard offset frequency) gives residual PM and AM noise values of approximately 18 fs and approximately 0.05% RMS, respectively (compared to approximately 193.5 fs and approximately 0.97% for the fundamentally-modelocked case). Integration out to the Nyquist frequency of approximately 5 GHz (excluding the supermode spikes in FIG. 2a) results in RMS fluctuations of approximately 94 fs and approximately 0.74% in phase and amplitude (compared to approximately 670 fs and approximately 3.36% in FIG. 2b). These results for the harmonically-modelocked system represents the lowest noise characteristics measured to date for an actively-modelocked, external-cavity semiconductor diode laser. For completeness, the inclusion of the supermodes in the harmonically-modelocked integrals (to Nyquist) results in RMS phase and amplitude fluctuations of approximately 284 fs and approximately 1.64%, respectively.

The shapes of the curves in FIGS. 2a and 2b agree well with theoretical predictions for actively-modelocked laser diode noise. See F. Rana and R. Ram, "Timing Jitter and Noise in Mode-Locked Semiconductor Lasers", Conference on Electro-Optics and Lasers 2001, paper CMB2. The fact that a knee and dropoff region follows the white noise characteristic at low offset frequencies implies that the two decades surrounding the knee provide the most significant contribution to the integrated pulsetrain noise. Depending on the rate at which the noise declines with frequency after the knee, these two decades are typically responsible for as much as approximately 95% of the RMS integral. In order to minimize the entire noise integral, then, it is desirable to keep the knee as close as possible to the carrier. Since the offset frequency of the knee is proportional to the longitudinal mode spacing of the cavity (and inversely proportional to the loaded Q-factor 7), the simplest way to reduce the knee offset for a given laser system is to increase the optical path length of the cavity. Unfortunately, this necessitates the need for modelocking at a higher cavity harmonic, which causes an increase in the number of supermode spikes contained within the Nyquist noise band.

Figure 3A:
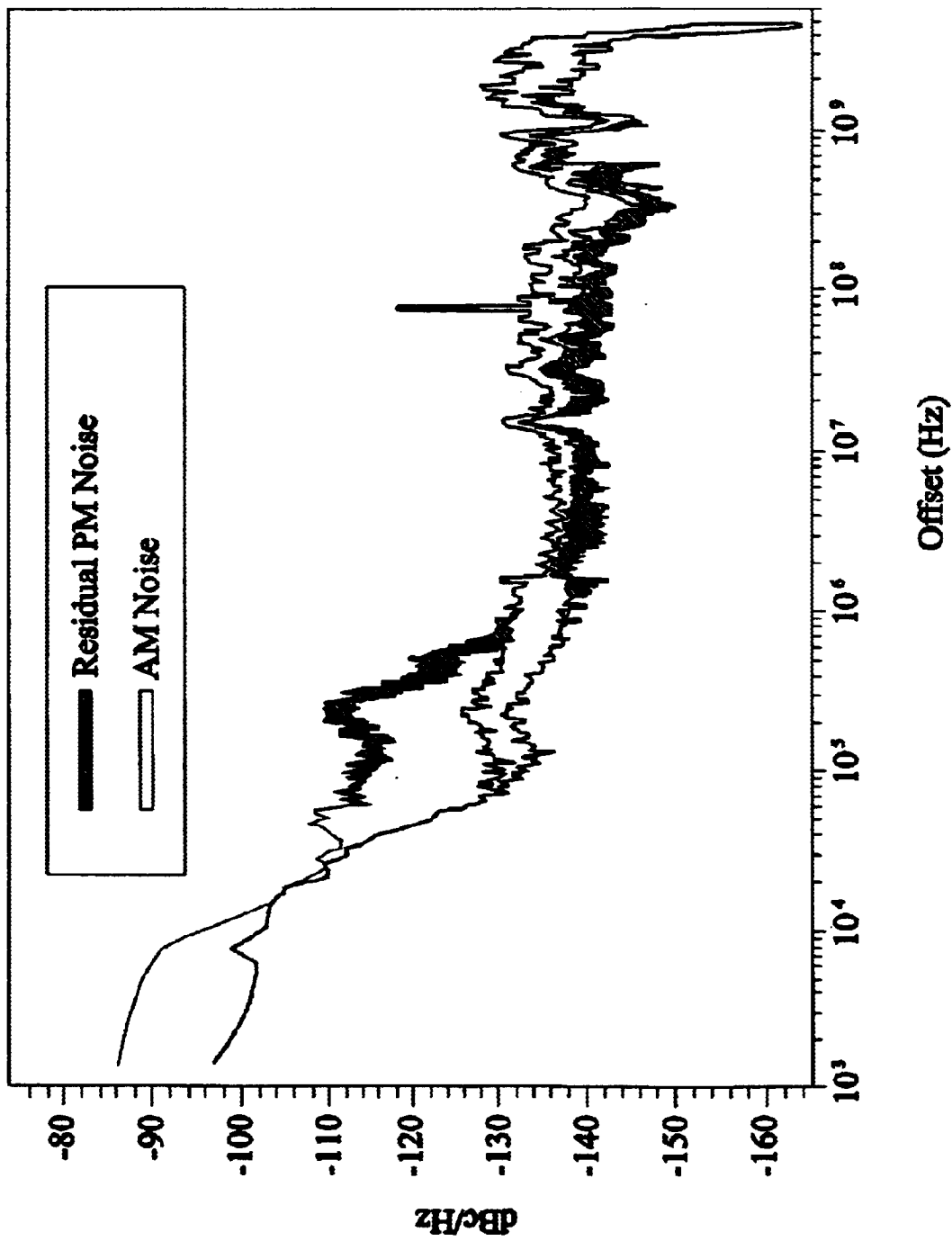
FIG. 3a shows modelocked laser noise sidebands showing suppressed supermodes using a fiber-Fabry-Perot etalon.
Figure 3B:
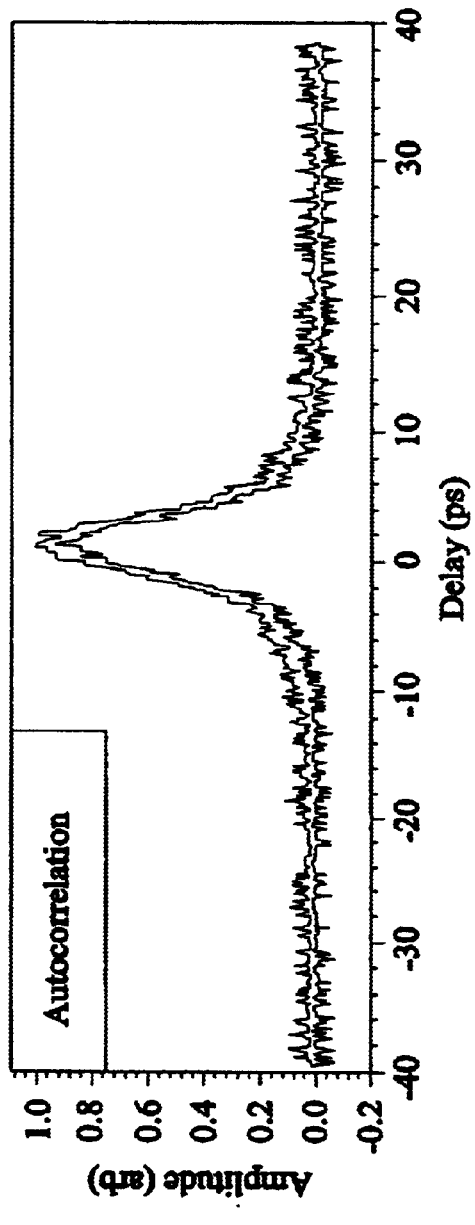
FIG. 3b shows an autocorrelation trace.
Figure 3C:
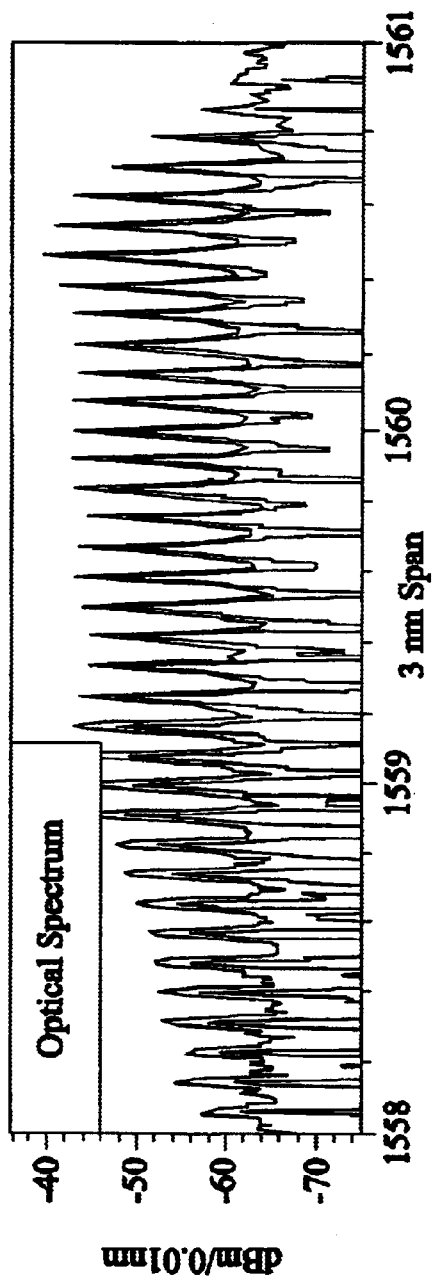
FIG. 3c shows a high resolution modelocked optical spectrum

To eliminate this noise in the laser system, an approximately 10 GHz high-finesse intracavity etalon was employed. The etalon served to promote strong coupling among only a single set of longitudinal modes spaced by approximately 10 GHz (i.e. a single supermode). The results of efficient supermode coupling are illustrated in FIGS. 3a–3c, which shows the measured AM and residual PM noise (FIG. 3a) in addition to the autocorrelation of the modelocked pulses (FIG. 3b) and the modelocked optical spectrum (FIG. 3c). The autocorrelation trace and optical spectrum are measured with a Femtochrome Research FR-103XL model autocorrelator and an Ando AQ6317B model optical spectrum analyzer (0.01 nm wavelength resolution), respectively. Dispersion-compensated pulsewidths as low as approximately 3.5 ps are achieved by locking approximately 21 longitudinal modes at a spacing of approximately 10 GHz. The interesting result in FIG. 3a is that the knee position remains at a relatively low offset frequency (approximately 300 kHz), while almost total suppression of supermode noise is achieved (approximately—140 dBc/Hz represents the lowest supermode noise yet reported in a harmonically-modelocked system).

The absence of supermodes now allows the noise of the harmonically-modelocked cavity to be more directly compared to that of a fundamentally-modelocked laser. In the case of supermode suppression, the RMS PM noise is approximately 35.5 fs (approximately 10 MHz) and approximately 165 fs (approximately 5 GHz) while RMS AM noise is approximately 0.077% (approximately 10 MHz) and approximately 1.41% (approximately 5 GHz). These results show that the lower-offset position of the knee in a harmonically-modelocked laser awards a significant advantage in pulse train noise over that is achieved with a fundamentally-modelocked system, providing the supermode noise can be controlled.

Using active harmonic modelocking at approximately 10 GHz in a mirrorless ring geometry lowest noise characteristics yet reported for an actively-modelocked external-cavity semiconductor diode laser are achieved, to the inventors' knowledge. Residual RMS jitter as low as approximately 18 fs (approximately 10 Hz—approximately 10 MHz) and approximately 94 fs (approximately 10 Hz–5 GHz), as well as RMS amplitude noise as low as approximately 0.05% (approximately 10 Hz–10 MHz) and approximately 0.74% (approximately 10 Hz–5 GHz) have been measured. In addition, through the use of a high-finesse fiber-Fabry-Perot intracavity etalon, nearly complete supermode suppression (below approximately—140 dBc/Hz) out to the Nyquist limit has been demonstrated while favorably retaining a low-offset noise knee.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of producing ultralow noise and supermode suppression in a laser having a laser cavity, comprising the steps of:
    modelocking the laser;
    suppressing noise from the laser with an intracavity filter; and
    generating ultralow noise pulse trains from the laser.

2. The method of claim 1, wherein the step of modelocking includes the step of:
    harmonically modelocking an external cavity.

3. The method of claim 2, wherein the step of harmonically modelocking includes the step of:
    harmonically modelocking the cavity at approximately 80 kHz.

4. The method of claim 3, wherein the semiconductor laser includes:
    a semiconductor diode ring laser.

5. The method of claim 1, wherein the step of modelocking includes the step of:
    modelocking a cavity with a Mach-Zehnder modulator (MZM) having an approximately 20 GHz modulation bandwidth.

6. The method of claim 1, wherein the step of modelocking the laser includes the step of:
    providing a semiconductor laser as the laser.

7. The method of claim 1, wherein the step of suppressing noise includes the step of:
    providing an etalon filter as the intracavity filter.

8. The method of claim 7, wherein the step of suppressing noise further includes the step of:
    providing an approximately 180 finesse, approximately 10 GHz fiber-Fabry-Perot (FFP) filter as the etalon filter.

9. The method of claim 1, wherein the step of generating includes the step of:
    generating an approximately 10 GHz pulse train from the laser.

10. The method of claim 1, wherein the ultra noise pulse trains include:
    residual phase modulation(PM) noise values of approximately 18 fs and amplitude modulation(AM) noise values of approximately 0.05% RMS.

11. The method of claim 1, wherein the ultra noise pulse trains include:
    residual phase modulation(PM) noise values of approximately 94 fs and amplitude modulation(AM) noise values of approximately 0.05% RMS.

12. A laser system for producing ultralow noise and supermode suppression, comprising:
    means for modelocking a laser;
    intracavity filter means for suppressing noise from the laser; and
    means for generating ultralow noise pulse trains from the laser.

13. The laser system of claim 12, wherein the modelocking means includes:
    means for harmonically modelocking an external cavity at approximately 80 kHz.

14. The laser system of claim 12, wherein the modelocking means includes:
    means for modelocking a cavity with a Mach-Zehnder modulator (MZM) having an approximately 20 GHz modulation bandwidth.

15. The laser system of claim 12, wherein the laser includes:
    a semiconductor laser.

16. The laser system of claim 12, wherein the intracavity filter means includes:
    an etalon filter.

17. The laser system of claim 16, wherein the etalon filter includes:
    an approximately 180 finesse, approximately 10 GHz fiber-Fabry-Perot (FFP) filter.

18. The laser system of claim 12, wherein the generating means includes:
    means for producing an approximately 10 GHz pulse train from the laser.

19. The laser system of claim 12, wherein the ultra low noise pulse trains include:
    residual phase modulation(PM) noise values of approximately 18 fs and amplitude modulation(AM) noise values of approximately 0.05% RMS.

20. The laser system of claim 12, wherein the ultra noise pulse trains include:
    residual phase modulation(PM) noise values of approximately 94 fs and amplitude modulation(AM) noise values of approximately 0.05% RMS.

* * * * *